United States Patent
Myers

(10) Patent No.: US 6,390,797 B1
(45) Date of Patent: *May 21, 2002

(54) APPARATUS FOR MANUFACTURING MULTICOLORED SOAP BARS

(75) Inventor: E. Gary Myers, Scottsdale, AZ (US)

(73) Assignee: The Dial Corporation, Scottsdale, AZ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/245,989

(22) Filed: Feb. 5, 1999

(51) Int. Cl.[7] ............................. B29C 47/10; B29C 47/04
(52) U.S. Cl. ................. 425/131.1; 264/75; 264/177.11; 425/145; 425/203
(58) Field of Search ..................... 425/131.1, 145, 425/202, 203, 376.1, 462; 264/75, 177.11

(56) References Cited

U.S. PATENT DOCUMENTS

| | | |
|---|---|---|
| 3,268,970 A | 8/1966 | Kelly et al. |
| 3,673,294 A | 6/1972 | Matthaei |
| 3,676,538 A | 7/1972 | Patterson |
| 3,832,431 A | 8/1974 | Matthaei |
| 3,868,208 A | 2/1975 | Fischer |
| 3,884,605 A | 5/1975 | Grelon |
| 3,890,419 A | 6/1975 | Kaniecki |
| 3,923,438 A | 12/1975 | Perla |
| 3,940,220 A | 2/1976 | D'Arcangeli |
| 3,999,921 A * | 12/1976 | Thor et al. |
| 4,011,170 A | 3/1977 | Pickin et al. |
| 4,017,574 A | 4/1977 | Joshi |
| 4,036,775 A | 7/1977 | Trautvetter et al. |
| 4,077,753 A | 3/1978 | Tanaka |
| 4,092,388 A * | 5/1978 | Lewis |
| 4,094,946 A | 6/1978 | Finkensiep et al. |
| 4,096,221 A | 6/1978 | Fischer et al. |
| 4,127,372 A | 11/1978 | Perla et al. |
| 4,164,385 A * | 8/1979 | Finkensiep |
| 4,196,163 A | 4/1980 | Finkensiep et al. |
| 4,474,545 A | 10/1984 | Mazzoni |
| 4,720,065 A | 1/1988 | Schonig et al. |
| 4,937,034 A * | 6/1990 | Sewell .................. 264/349 |

* cited by examiner

Primary Examiner—Mark Eashoo
(74) Attorney, Agent, or Firm—Richard G. Harrer

(57) ABSTRACT

This invention relates to an apparatus and method for introducing various additives in solid form into a soap mass for the ultimate manufacture of soap bars. Specifically, the invention is directed to producing soap bars having a multicolored or marbleized appearance and made from a variety of different colored soap materials. Soap pellets having a color are introduced into a soap plodder as is customary. A second or alternate color of soap pellet is separately introduced into the interior of the plodder just before that point where the helical screw of the plodder enters the barrel of the extruder portion of the plodder. The plodder has been structurally modified so that the second or alternate color pellet is introduced into the plodder by means of a special feeding apparatus which not only controls the rate of delivery of the alternate color soap pellets but insures the pellets are directly introduced into the chamber formed by a flight of the helical screw immediately before the point where the screw enters the plodder barrel.

8 Claims, 3 Drawing Sheets

400
APPARATUS FOR MANUFACTURING MULTICOLORED SOAP BARS

FIELD OF THE INVENTION

This invention pertains to a method and apparatus for introducing various ingredients in solid form into a soap ma for the ultimate manufacture of soap bars. More particularly, this invention is directed to producing soap bars having a multicolored or marbled appearance and made from a variety of different colored soap materials. This invention also includes a method and apparatus for introducing ingredients other than different colored soap materials into a soap mass, such other ingredients including those which may be sensitive to the grinding and crushing forces normally found in soap making techniques.

BACKGROUND OF THE INVENTION

In the soap art there are two basic systems for producing marbleized soap bars. One is called a solid/liquid system and involves the introduction of a colored liquid into a soap mass during working or plodding of the soap to get a bar with a marbled appearance such as disclosed in U.S. Pat. No. 3,485,905 to Compa.

A second system is called a solid/solid system and involves mixing through a variety of techniques different colored non-liquid soap materials to form the marbleized bar.

There can be difficulties with the use of either system. For example, in the solid/liquid systems, the striped or marbleized effects can be unsatisfactory because they are smeared or even disappear entirely. Also, the equipment required to inject a liquid dye into the soap mass to produce the marbled effect is often very complicated and therefore expensive to make, use and service. In the solid/solid system there have been reports of marbleized bars that suffer from defects such as splitting and face cracking due to the inability of the different soap elements of the bar to adequately bond together. Even more importantly, a number of techniques can not produce a bar having a discreet marble pattern with no smearing.

Furthermore, the methods and equipment employed in most solid/solid systems, that is particularly in the plodding operation, would not be suitable to preserve the integrity of sensitive materials desired to be added to soap bars such as encapsulated dyes, fragrances and the like.

SUMMARY OF THE INVENTION

This invention pertains to a method and apparatus for introducing various additives in solid form into a soap mass for the ultimate manufacture of soap bars. As used in this specification and appended claims the terms soap, soap materials or soap bars will include water soluble soaps made from alkali salts of $C_8$–$C_{22}$ fatty acids as well as products made from synthetic detergents or a mixture of water soluble soap and synthetic detergents. In one aspect, this invention is directed to producing soap bars having a multicolored or marbleized appearance and made from a variety of different colored soap materials. The method and apparatus of this invention is also useful for introducing ingredients or additives in solid form other than different colored soap materials into a soap mass, such other ingredients including those which may be particularly sensitive to the grinding and crushing forces normally found in soap making procedures. Such other additives or ingredients which can be incorporated into a soap mass and ultimately into a soap bar include encapsulated dyes or fragrances. The microcapsules that are normally used to encapsulate dyes, fragrance and the like are usually sensitive to the grinding forces found in soap making and this method and apparatus can be used to preserve the integrity of such capsules. Other encapsulated materials which can be introduced into the soap mass include sunscreens, skin moisturizers and conditioners, personal deodorants or antibacterial agents and the like.

In one aspect the method involves introducing solid soap in pellet or granular form of one color into a soap plodder as is customary. A second or alternate color of soap pellet is separately introduced into the interior of the plodder just before that point where the helical screw of the plodder enters the barrel of the extruder portion of the plodder. The plodder is structurally modified so that the second or alternate color is introduced into the plodder by means of a special pellet feeding apparatus which not only controls the rate of delivery of the alternate color soap pellets but insures that such pellets are introduced into a chamber formed by a flight of the helical screw immediately before the point where the screw enters the plodder barrel. When the alternate color pellet is introduced at this particular point in the plodder apparatus, a very discreet marble pattern in the soap bar is the result and very little if any smearing of the contrasting colors takes place.

If it is desired to introduce ingredients or additives other than a second or alternate color soap pellet into the soap mass, that is a non-soap ingredient in solid form such as an encapsulated fragrance or color, such capsules can be introduced into the interior of the plodder at the same point that the introduction of the second color soap pellet takes place. That is, into a chamber formed by adjacent flights of the helical screw immediately before the point where the screw enters the plodder barrel. The same special pellet feeding apparatus can be used to introduce the non-soap solid material, as used to introduce the colored soap pellets. Such non-soap solid materials can be added either along with the colored soap pellets or they can be introduced independent of one another.

DESCRIPTION OF THE PREFERRED EMBODIMENTS

Figure 1:
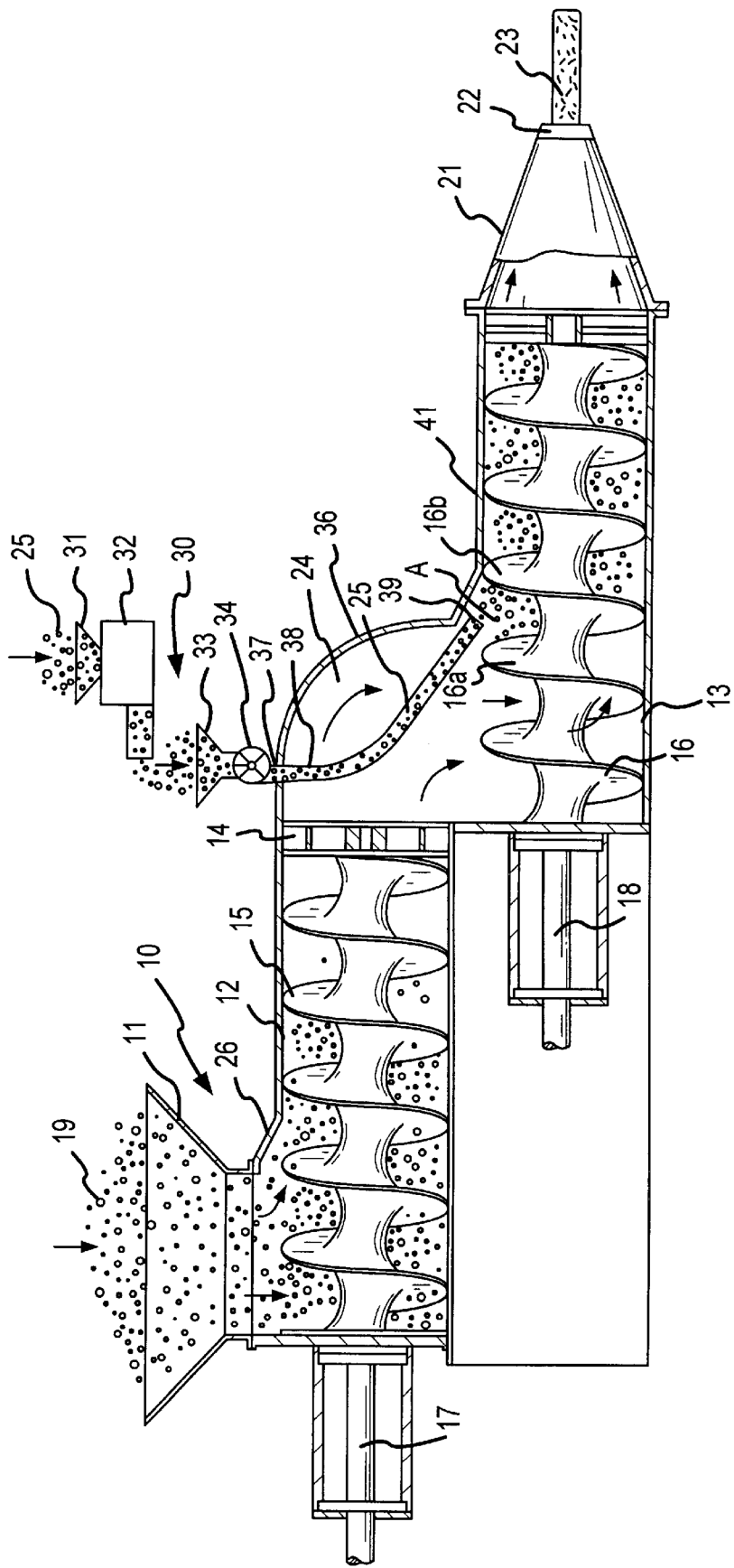
FIG. 1 is a side elevation mainly in section showing a soap plodding apparatus incorporating the invention according to a preferred embodiment; the plodder being a so-called two stage vacuum plodder.

FIG. 1 shows a soap plodder apparatus 10 which has been structurally modified to incorporate the teachings of this invention. As shown, plodder 10 is of the duplex type in that it includes two plodders, a first stage plodder 12 and a second stage plodder 13. Such a duplex plodder is well known in the soap art. This particular plodder is of the vacuum type, although as will be later seen, single stage and non-vacuum plodders also can be modified to incorporate the teachings of the invention.

As shown in FIG. 1, soap pellets 19 are introduced through hopper 11 into first stage plodder 12 adjacent one end of helical screw 15 rotated by means (not shown) coupled to shaft 17. The soap pellets are compacted and worked by the screw during passage through the barrel 26 of first stage plodder 12 and forced through a fixed foraminous plate or screen assembly 14 that subdivides the compacted soap into soap noodles which are then cut by a rotary cutter (not shown) mounted to shaft 17 and mounted immediately adjacent to plate 14. The soap noodles then drop through space 24 which opens into one end of helical screw 16 in the second stage plodder 13. Helical screw 16 is provided with a shaft 18 driven by means (not shown) for continuously rotating the screw. The soap is again compacted and worked by screw 16 as it is forced towards the discharge end of second stage plodder 13. It then enters a conical extension 21 of the barrel 41 of the plodder and is extruded through nozzle 22 to impart a predetermined cross sectional shape (for example rectangular) to the billet of soap 23 being extruded therethrough. Although not shown, this particular soap plodder apparatus utilizes a source of vacuum which is connected to the interior of the plodder apparatus, although vacuum is not necessary for the proper operation of this invention. Thus far, the soap plodder apparatus 10 as described is of conventional construction and is well known in the soap making art.

Referring again to FIG. 1, duplex vacuum plodder apparatus 10 has been structurally modified by the inclusion of a soap pellet feeding apparatus shown generally at 30. Soap pellet feeding apparatus 30 is mounted to the plodder apparatus 10 so that a controlled amount of different colored soap pellets are introduced in a special way so that the advantages of this invention may be obtained.

A supply of soap pellets 25 of a color different from pellets 19 is introduced into hopper 31 connected to pellet feeder 32 which is adjustable so that the rate of soap pellet addition to the plodder apparatus 10 may be controlled. After leaving feeder 32, the pellets are introduced into hopper 33 and then through rotary valve 34. From rotary valve 34 the pellets are conveyed to pellet feed tube 38 which passes through port 37 of plodder housing 36 and into space 24 which connects the first stage and second stage plodders 12 and 13 respectively. Since plodder 10 including second stage plodder 13 is operating under vacuum, the use of rotary valve 34 allows introduction of the pellets into the plodder without unduly reducing the vacuum within the plodder. It is important to note that the discharge end 39 of feed tube 38 is positioned within the interior of second stage plodder 13 so that the different colored pellets 25 are introduced into a chamber designated "A". Chamber A is the space formed between adjacent flights 16a and 16b of helical screw 16 and barrel 41 of second stage plodder 13. Importantly, chamber A is the space formed just before screw 16 enters barrel 41 of second stage plodder 13. Put another way, alternate color pellets 25 are introduced in the second stage plodder 13 at a point where the screw 16 enters barrel 41 at the discharge side of the plodder 10. If the introduction of solid non-soap ingredients such as encapsulated colors or fragrances into the soap mass is desired, such ingredients are introduced into hopper 31 and conveyed to chamber A in the very same manner as the introduction of pellets 25. The encapsulated ingredients may include colors, fragrances, sunscreens, skin conditioners and the like. Such encapsulated ingredients are well known in the art and are generally in the form of microspheres made of gelatin, lecithin and urea formaldehyde. The encapsulated ingredients may be introduced into the system along with or without the soap pellets 25.

Figure 3:
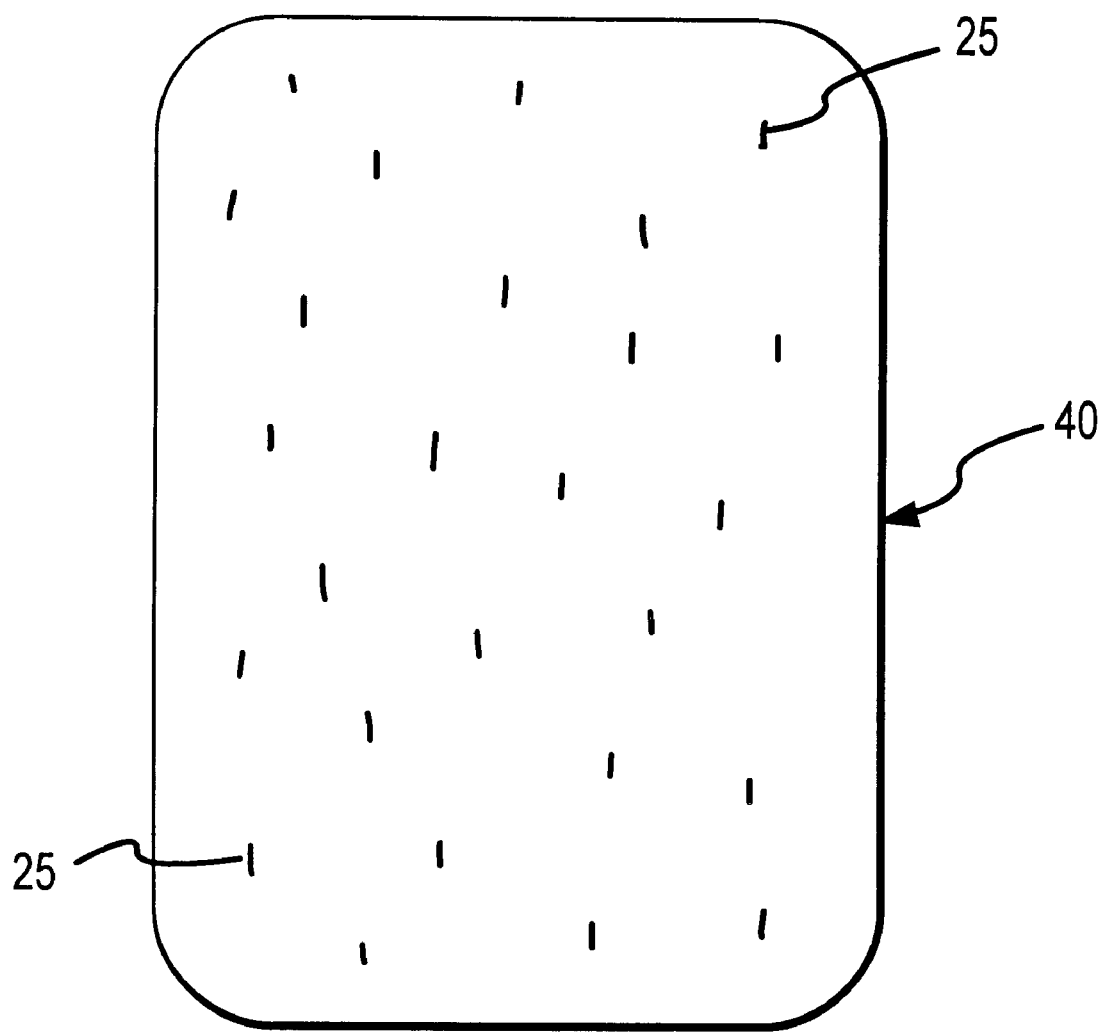
FIG. 3 is a plan view of a bar of soap showing discrete colored soap particles dispersed throughout the bar.

By introducing the alternate color soap pellets in the chamber A just prior to the screw entering the barrel 41, a very consistent marble pattern in the soap bars is obtained. It is also possible to incorporate more than one feed tube in the chamber A to get several different marbled colors in the soap bar. It is also possible to change the marbleized pattern by using varying proportions of the different color pellets. For example, one can use 70% of white pellets 19 and 30% of green pellets 25 to achieve a certain pattern. This ratio may of course may be changed and this is easily done by virtue of pellet feeder 32. Additionally, the soap pellets 19 and 25 can be of varying size. That is, and for example, the white pellets 19 could be one half inch by one quarter inch and the green pellets 25 could be of a smaller size. It is a feature of this invention that the soap pellets 25 introduced in the soap plodder 10 by way of the soap pellet feeding apparatus 30 can vary broadly in size from, for example, about one half by about one fourth inches to much smaller particle size, approximately that of rice, nominally about one eighth by about one sixteenth inches. When the much smaller particles are employed it is preferred that they stay discrete in the finished bar and this is easily accomplished in this process. As shown in FIG. 3, discrete rice-sized particles of soap 25 are dispersed throughout soap bar 40 giving a unique visual appearance. Such soap particles are easily incorporated into the bar through the use of soap pellet feeding apparatus 30. Such particles are of a different color than that of the main portion of the bar or can even be a variety of colors for an even more interesting effect. Additionally the particles may be enriched with additives such as skin conditioners, antibacterials and the like.

From the foregoing it is seen that by virtue of using the soap pellet feeding apparatus 30, one can incorporate a wide variety and size of alternate soap pellets and/or encapsulated non-soap ingredients such as encapsulated colors or fragrances into a soap bar. The method and apparatus of this invention not only prevents smearing of marbleized patterns but allows the incorporation of sensitive encapsulated ingredients without grinding or breakage of the capsules. Additionally, the invention preserves the rice sized particles of colored soap and produces the unique appearance as depicted in FIG. 3.

Figure 2:
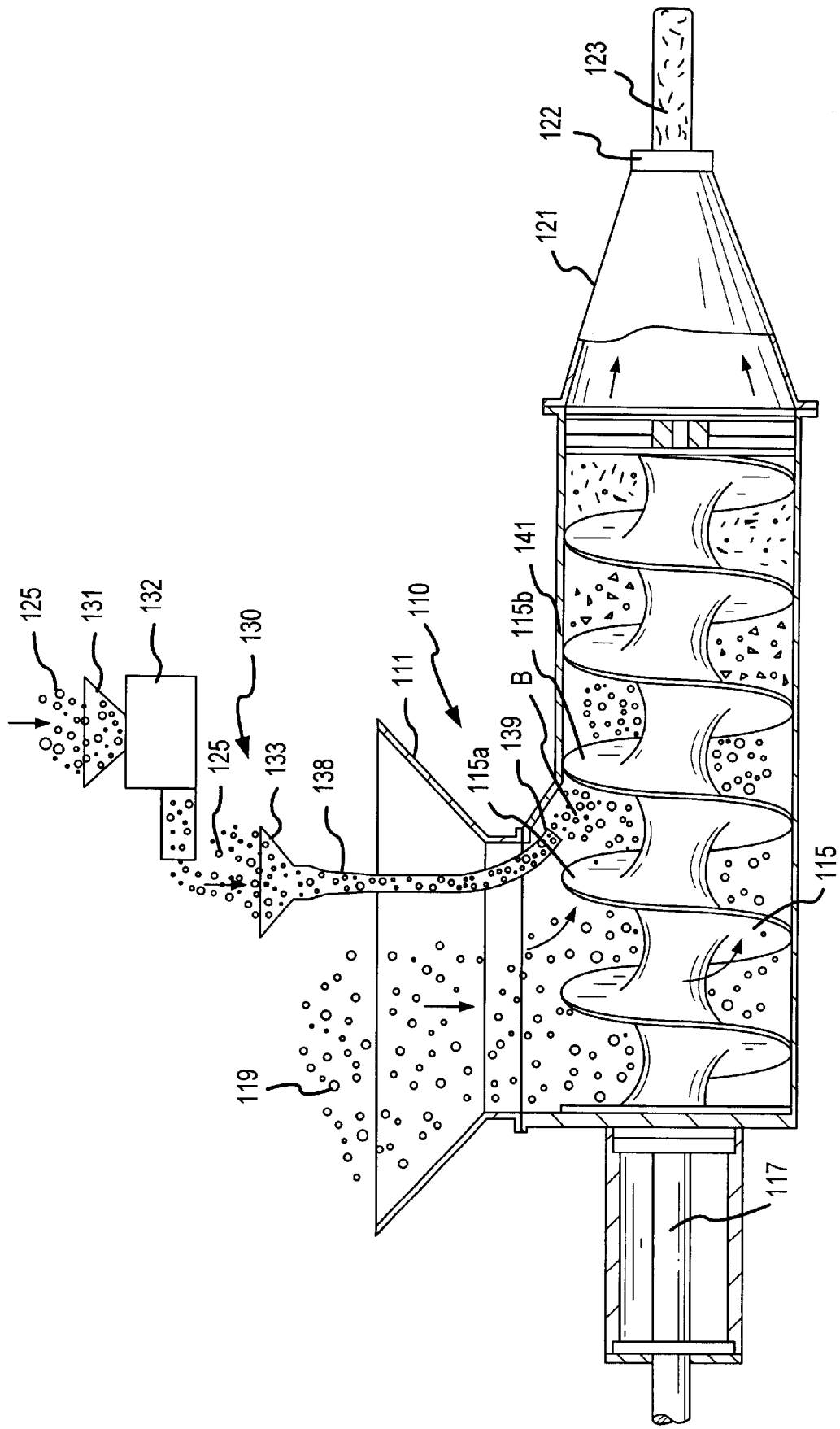
FIG. 2 is a side elevation mainly in section showing soap plodding apparatus incorporating the invention according to a preferred embodiment; the plodder being a single stage non-vacuum plodder.

FIG. 2 shows a soap plodder apparatus 110 which also has been structurally modified to incorporate the teachings of this invention. Plodder 110 is a single stage non-vacuum plodder and is well known in the soap making art. Soap pellets 119 of a white or other color are introduced into hopper 111 and then into the plodder where they make contact with helical screw 115 rotated by means (not shown) coupled to shaft 117 of screw 115. The soap pellets are compacted and worked by the screw during passage through plodder 110.

Plodder 110 is provided with alternate color pellet feeding apparatus shown generally at numeral 130. Because plodder apparatus 110 is of a single stage non-vacuum type, the alternate color pellet feeding apparatus 130 can be mounted so that the alternate color soap pellets 125 are fed through feed tube 138 which passes through hopper 111. As shown, alternate color pellet feeding apparatus 130 is quite similar to that used in the apparatus shown in FIG. 1. A supply of alternate color soap pellets 125 is introduced into hopper 131 which is connected to pellet feeder 132. Pellet feeder 132 controls the rate of soap pellet addition to apparatus 110. From feeder 132 the pellets are conveyed into hopper 133 and then into feed tube 138. As with the apparatus shown in FIG. 1, it is important to note how the end 139 of feed tube 138 is positioned within the interior of plodder 110 and particularly into the chamber designated "B". Chamber B is the space formed between adjacent flights 115a and 115b of screw 115 and the barrel 141 of the plodder. Importantly, this is the space formed just before the screw 115 enters the barrel 141 of plodder 110. Although not shown, this barrel portion of the plodder is often surrounded by means for controlling the temperature of the soap as it is being worked.

After the soap has passed through barrel 141, it enters conical extension 121 of barrel 141 and is then extruded through nozzle 122 to impart a predetermined cross sectional shape to the billet of soap 123 being extruded there through.

By introducing the alternate color soap pellets 125 into chamber B of the screw 115 just prior to the screw entering the barrel 141, one is able to obtain a very consistent marble or multicolored pattern in the soap bars. As with the apparatus shown in FIG. 1, it is also possible to use more than one feed tube to get several different marbled colors in the soap bar.

As with the apparatus shown in FIG. 1, if the introduction of solid non-soap ingredients such as encapsulated colors or fragrances into the soap mass is desired, such ingredients are introduced into hopper 131 and conveyed to chamber B in the very same manner as the introduction of pellets 125. Such encapsulated ingredients may include colors, fragrances, sunscreens, skin conditioners and the like. Such encapsulated ingredients are well known in the art and are generally in the form of microspheres made of gelatin, lecithin and urea formaldehyde. Such non-soap ingredients may be introduced in the system along with or without pellets 125.

What is claimed:

1. Apparatus for introducing various ingredients in solid form into a soap mass to manufacture soap bars comprising:
   a. a soap plodder for producing extruded soap, said plodder having a rotatable helical screw for working said soap, with at least a portion of said screw being surrounded by the barrel of said plodder;
   b. a soap inlet positioned at one end of said soap plodder for introducing soap pellets having a color into the interior of said plodder and in contact with said helical screw;
   c. with the interior of said plodder having a chamber formed between adjacent flights of said helical screw, said chamber being positioned immediately before said helical screw enters the barrel of said plodder; and
   d. means separate from said soap inlet for introducing additives in solid form directly into said chamber without any mixing of said additives with said soap pellets having a color prior to their introduction to said chamber, said means terminating in the interior of said chamber.

2. The apparatus of claim 1 wherein said plodder is a single stage plodder.

3. The apparatus of claim 2 wherein said separate means for introducing said additives includes means for controlling the rate of addition of said additives to said chamber of said plodder.

4. The apparatus of claim 3 wherein said means includes a feed tube for conveying soap pellets from a source outside of said plodder to said chamber.

5. The apparatus of claim 1 wherein said plodder is a two stage plodder and wherein said soap inlet for introducing soap pellets having a color is in the first stage thereof and wherein said means for separately introducing additives in solid form to said chamber is in the second stage of said plodder.

6. The apparatus of claim 5 wherein said means for introducing said additives includes means for controlling the rate of addition of said additives to said chamber of said plodder.

7. The apparatus of claim 6 wherein said plodder operates under vacuum and wherein said means for introducing said additives includes a rotary valve to prevent loss of vacuum in said plodder.

8. The apparatus of claim 7 wherein said means include a feed tube for conveying soap pellets from a source outside of said plodder to said chamber.

* * * * *